(12) United States Patent
Byun et al.

(10) Patent No.: US 12,141,987 B2
(45) Date of Patent: Nov. 12, 2024

(54) METHOD FOR EXTRACTING ROOF EDGE IMAGE FOR INSTALLING SOLAR PANEL BY USING MACHINE LEARNING

(71) Applicant: NANOOMENERGY CO., LTD., Jeju-si (KR)

(72) Inventors: Yungcheol Byun, Jeju-si (KR); Jihyeok Yang, Jeju-si (KR); Debaprya Hazra, Jeju-si (KR)

(73) Assignee: NANOOMENERGY CO., LTD., Jeju-si (KR)

( * ) Notice: Subject to any disclaimer, the term of this patent is extended or adjusted under 35 U.S.C. 154(b) by 334 days.

(21) Appl. No.: 17/789,034

(22) PCT Filed: Jul. 31, 2020

(86) PCT No.: PCT/KR2020/010178
§ 371 (c)(1),
(2) Date: Jun. 24, 2022

(87) PCT Pub. No.: WO2021/132829
PCT Pub. Date: Jul. 1, 2021

(65) Prior Publication Data
US 2023/0057612 A1 Feb. 23, 2023

(30) Foreign Application Priority Data
Dec. 26, 2019 (KR) .................. 10-2019-0175767

(51) Int. Cl.
*G06K 9/00* (2022.01)
*G06T 7/13* (2017.01)
(Continued)

(52) U.S. Cl.
CPC .............. *G06T 7/13* (2017.01); *G06T 7/181* (2017.01); *G06V 10/267* (2022.01); *G06V 10/44* (2022.01);
(Continued)

(58) Field of Classification Search
CPC . G06T 7/13; G06T 7/181; G06T 2207/20081; G06T 2207/20084;
(Continued)

(56) References Cited

U.S. PATENT DOCUMENTS

2021/0089811 A1* 3/2021 Strong ................. G06V 20/176
2021/0133936 A1* 5/2021 Chandra .................. G06T 5/50

OTHER PUBLICATIONS

Shi, Yilei, Qingyu Li, and Xiao Xiang Zhu. "Building footprint generation using improved generative adversarial networks." IEEE Geoscience and Remote Sensing Letters 16.4 (2018): 603-607 (Year: 2018).*

(Continued)

*Primary Examiner* — Andrew M Moyer
(74) *Attorney, Agent, or Firm* — Sughrue Mion, PLLC

(57) ABSTRACT

The present invention relates to a method of extracting a roof edge image for solar panel installation by using machine learning, the method comprising: a training step for passing original rooftop image data through a second generation unit of an image extraction system to output an image similar to a target image, and passing image data, from which a rooftop edge has been detected, through a first generation unit of the system to identify the image data from an original image; a step for segmenting an obstruction hiding a roof edge, and receiving, by a second discriminator unit, an image in which the roof edge has been detected; a step for optimizing the weight of a parameter, and training the second generation unit and the second discriminator unit again; and a step for automatically connecting edge portions after extracting edges, and generating a complete roof edge image.

6 Claims, 8 Drawing Sheets

(51) Int. Cl.
  *G06T 7/181* (2017.01)
  *G06V 10/26* (2022.01)
  *G06V 10/44* (2022.01)
  *G06V 10/774* (2022.01)
  *G06V 10/82* (2022.01)

(52) U.S. Cl.
  CPC ............ *G06V 10/774* (2022.01); *G06V 10/82* (2022.01); *G06T 2207/20081* (2013.01); *G06T 2207/20084* (2013.01); *G06T 2207/30184* (2013.01)

(58) Field of Classification Search
  CPC . G06T 2207/30184; G06T 2207/30181; G06T 7/12; G06T 7/11; G06V 10/267; G06V 10/44; G06V 10/774; G06V 10/82; G06V 20/13; G06V 20/17; G06N 3/045; G06N 3/047; G06N 3/088; G06N 3/0475; G06N 3/08; H04L 9/08
  See application file for complete search history.

(56) References Cited

OTHER PUBLICATIONS

Kumar, Akash. "Solar potential analysis of rooftops using satellite imagery." arXiv preprint arXiv:1812.11606 (2018). (Year: 2018).*

* cited by examiner

METHOD FOR EXTRACTING ROOF EDGE IMAGE FOR INSTALLING SOLAR PANEL BY USING MACHINE LEARNING

TECHNICAL FIELD

The present invention relates to a method of extracting a roof edge image for solar panel installation by using machine learning, and more particularly, a method of extracting a roof edge image for solar panel installation by using machine learning capable of extracting an edge image of a building roof on which a solar panel is installed. The method automatically produces parts of an edge image and automatically connects the roof edge parts to create and extract the roof edge image even if the roof edge is hidden by obstacles.

BACKGROUND ART

In recent years, most of the idle sites where photovoltaic power generation can be installed in buildings are occupied by the roof layer of the building, and although a large number of photovoltaic facilities are being installed, the aesthetics of the building, the safety of damage to the waterproofing layer and the protective layer crack cannot be secured. In order to solve this problem, it is necessary to design a photovoltaic system that can harmonize with the building and secure the safety of the building from the initial stage of designing the building.

To this end, first, it is necessary to consider the installation of a solar panel based on the floor plan of the building roof. Instead of the floor plan of the building, the installation of a solar panel can be considered with the original photo of the roof top.

However, when objects around the building are located on the building in the rooftop photo, it is impossible to secure the entire image of the building.

On the other hand, with the recent development of artificial intelligence (AI) and Deep Learning, Generative Models are newly developed.

There are generative models such as Generative Adversarial Network (GAN) and Variational Autoencoder (VAE). These generative models mean the models which are able to learn and to generate rules within the data that are difficult to mathematically define probability distributions such as images and audio.

In particular, generative adversarial network (GAN) is a rapidly growing model that has received attention in industrial and academic field. In the case of recently announced CycleGAN and StarGAN, when there is image data of two or more domains, it is a generative model that moves the image of one domain to another domain.

A conventional generative model can change a horse into a zebra, and also change a zebra into a horse when, there are photographic data of horses and photographic data of zebras, for example.

When this conventional generative model technique is applied, only desired information in the image can be transformed, and the other data can be preserved.

Recently, it has become possible to obtain rooftop images through various routes ranging from aerial photographs, satellite photos, or images taken by drones.

Accordingly, there is a need for a system and method for generating and extracting both the roof image and the edge image using machine learning for the edge of the roof hidden behind the obstacles for the layout design of the solar panel from the available rooftop images.

DISCLOSURE

Technical Problem

The present invention has been made in view of the above problems, and it is an object of the present invention to provide a method of extracting a roof edge image for solar panel installation by using machine learning capable of extracting an edge image of a building roof on which a solar panel is installed, that automatically produces parts of an edge image and automatically connects the roof edge parts to create and extract the roof edge image even if the roof edge is hidden by obstructions.

Technical Solution

A method of extracting a roof edge image for solar panel installation by using machine learning for a generative adversarial neural network (GAN) based image conversion model comprises: inputting original rooftop image data (A) and an image data set (B) in which the rooftop edge is detected into the roof edge image extraction system; the original rooftop image data (A) being inputted to a second generator unit of the system and passing through the second generator unit of the system and the second generator unit outputting an image (O) similar to a target image (T); image data (B) in which the rooftop edge is detected being inputted to the first generator unit of the system and passing the first generator unit of the system; the first generator unit mapping noise samples and inserting obstructions into the input image data (B); a first discriminator unit of the system having access to the original input image data set and receiving the output from the first generator unit as an input, training to discriminate each region between the original image and the received input; parameters for segmentation being altered and rectified according to the adversarial training result between the first generator unit and the first discriminator unit, obstruction hiding the edge of the roof being segmented, and a second discriminator unit receiving the image in which desirable roof edges are detected; the second discriminator unit receiving a first pair (A, T) of the original image data and the output image output from the first discriminator unit and a second pair (A, O) of the original image data and the image output from the second generator unit, respectively, predicting the correct output image from each pair, and weights of the parameters assigned to the second generator and the second discriminator being optimized according to the prediction accuracy, the second generator and the second discriminator being trained again; and the roof edge image extraction system removing the obstructions hiding the edge portion of the roof image, extracting the edge of roof image, connecting the edge parts automatically and generating the complete roof edge image.

Also, in the method of extracting a roof edge image for solar panel installation by using machine learning, the generative adversarial neural network (GAN) includes two generator units and two discriminator units and receives the original image (A) region as input, trains to generate an output image of the target image (T) region, and the GAN repeats training so as to extract all the edges of the roof hidden behind obstructions.

Also, in the method of extracting a roof edge image for solar panel installation by using machine learning, the generative adversarial neural network (GAN) based image conversion model is a pixel-to-pixel generative adversarial neural network (Pix2pix GAN).

Also, in the method of extracting a roof edge image for solar panel installation by using machine learning, the first generator unit receives Canny edge detected images and outputs by repeating encoding and decoding.

Also, in the method of extracting a roof edge image for solar panel installation by using machine learning, the second generator unit comprises encoding process, and the encoding process comprises a convolution process, a batch normalization process, and a rectification linear process.

Also, in the method of extracting a roof edge image for solar panel installation by using machine learning, the second generator unit comprises decoding process, and the decoding process comprises a deconvolution process, a batch normalization process, and a rectification linear process.

Advantageous Effects

According to the present invention, we can extract the edge image of the rooftop of the building where the solar panel is installed from various rooftop image data by utilizing machine learning.

The present invention automatically produces the edge of the rooftop image and connects the edge of the rooftop even when the edge of the roof is hidden by obstructions to generate and extract the edge of the rooftop through machine learning of a generative adversarial neural network.

BEST MODE

Hereinafter, a roof edge image extraction system and method for solar panel installation using machine learning according to embodiments of the present invention will be described in detail with reference to the accompanying drawings.

The present invention is a system and method using machine learning for a generative adversarial network (GAN) based image conversion model for the purpose of extracting roof edge images for solar panel installation.

The image conversion model is trained for the purpose of automatically producing the edges of the roof image and learning how to automatically connect the edges of the roof while ignoring the objects around the roof boundary.

Figure 1:
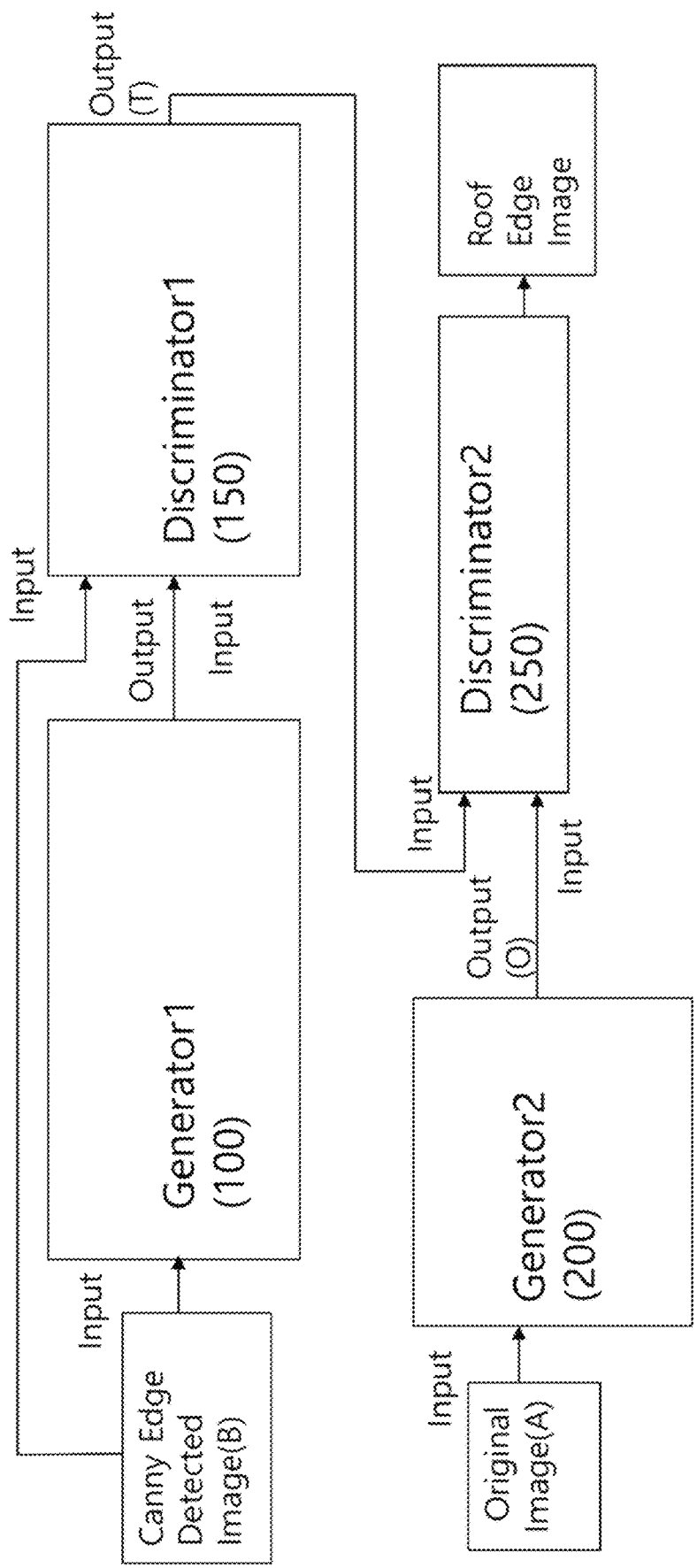
FIG. 1 is a block diagram of a roof edge image extraction system for solar panel installation using machine learning according to the present invention.

FIG. 1 is a block diagram of a roof edge image extraction system for solar panel installation using machine learning according to the present invention.

Referring to FIG. 1, the roof edge image extraction system for solar panel installation using machine learning according to an embodiment of the present invention includes a first generator unit 100, a first discriminator unit 150, and a second generator unit 200, and a second discriminator unit 250.

As shown in FIG. 1, the configuration of the roof edge image extraction system for solar panel installation using machine learning according to the present invention comprises two generator units and two discriminator units which receive an original image data set as an input and generate target image data as an output.

The first generator unit 100 receives an image data set identified by the edge boundary detection algorithm from the original image as an input, maps and outputs obstructions that hide the edges as noise samples, These obstructions are trees chimneys, disks, etc. that hide the edges of the building around the roof of the building, so it is impossible to accurately distinguish the edges of the building roof.

The first discriminator unit 150 receives the result output from the first generator unit 100 as an input, and performs learning to identify each region between the original image and the image input from the first generator unit 100

The second generator unit 200 receives the original image data set and performs encoding and decoding processes to generate an output image similar to a desired target image.

Then, the second discriminator unit 250 receives the first pair of the original image input to the second generator unit 200 and the target image passing the first discriminator unit 150 which is outputted with its parameters altered and rectified according to the adversarial training result, and the second pair of the original image input to the second generator unit 200 and the desired output image similar to the target image passing the second generator unit 200, and the second discriminator unit 250 predicts the corrected output image.

As a result, the second discriminator unit 250 generates a complete edge image by removing the obstructions hiding the edge of the roof image and connecting the edge hidden by the obstructions.

Accordingly, in the roof edge image extraction system for solar panel installation using machine learning of the present invention, the adversarial neural network (GAN) comprises the two generators and the two discriminators and receives the detected edge image area as an input and generates an output image of the target image domain area The adversarial neural network (GAN) for image conversion can use Cycle GAN, DiscoGAN and Pix2pix GAN, but in order to derive the best results from the roof edge image extraction system for solar panel installation using the machine learning of the present invention, an image conversion model based on a pixel generative adversarial neural network (Pix2pix GAN) is preferred.

The image conversion model (Pix2pix GAN) repeats the training to remove the object hiding the edges of the roof image and automatically connects the edges, and the model learns to generate a complete edge image of the roof image after automatically connecting the edges of the roof.

Also, the reason why pixel-to-pixel generative adversarial neural networks (Pix2pix GANs) are preferred is that they are one-to-one image style migration models that accept image data pairs that can be translated from one image region to another.

Through adversarial training, the model learns to remove obstructions (trees, chimneys, discs, etc.) that hide the edge of the roof.

As a result, it is possible to automatically extract the complete edge of the roof image after the edges are connected after removing the obstructions.

As a data set for training a pixel-to-pixel generative adversarial neural network (Pix2pix GAN), an original rooftop image set is taken as data set A, and a rooftop edge confirmed image set is taken as data set B, a pixel-to-pixel generative adversarial neural network is trained.

Figure 7:
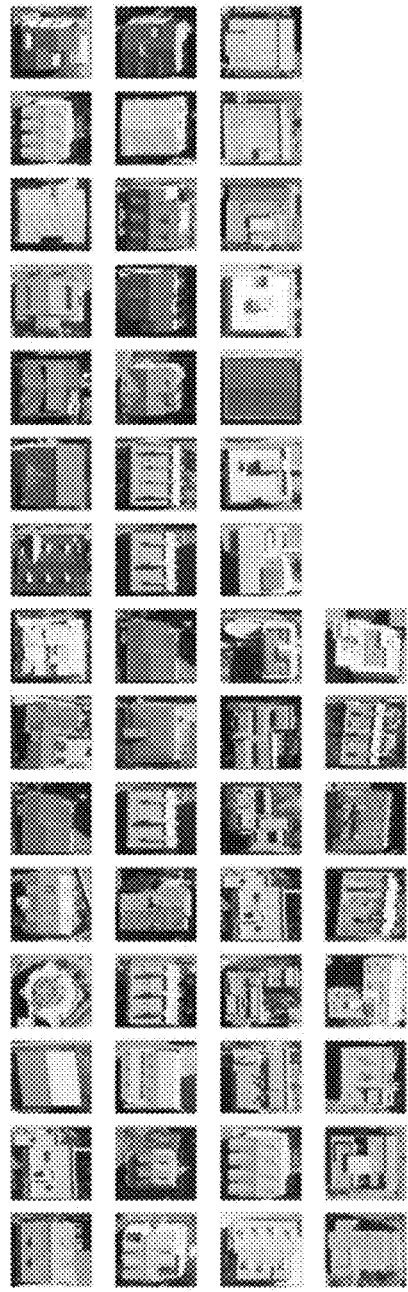
FIG. 7 shows a data set for machine learning of a generative adversarial neural network according to the present invention.
Figure 7:
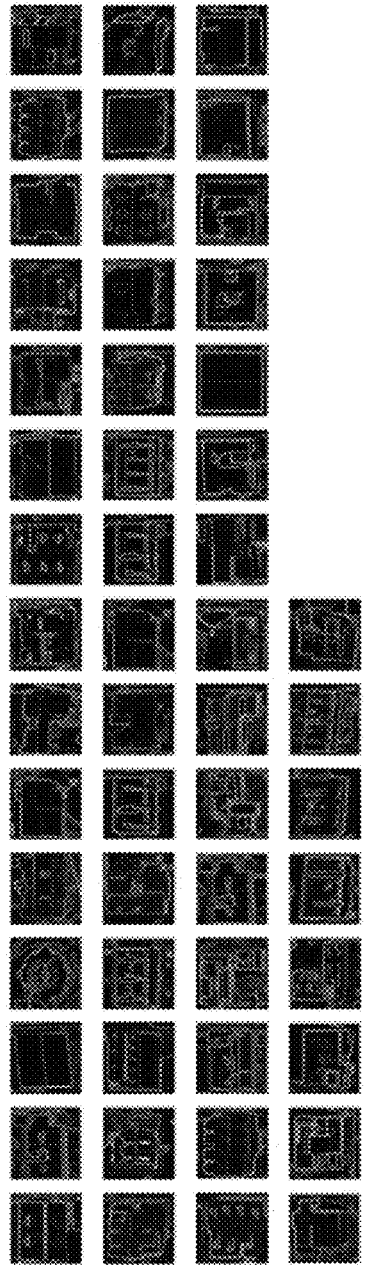

FIG. 7 shows a data set for machine learning of a generative adversarial neural network according to the present invention.

Also, data set B is a collection of images identified by a boundary detection algorithm (Canny edge detection) from original image data A.

In this way, the adversarial neural network (GAN) experiences semi-supervised learning to train to convert an image from one form to another.

For example, a picture of a tree is inserted into an original image and edges are hidden to get image set A, and the treeless original image is used for data set B.

An adversarial neural network (GAN) learns to [input] a picture of a tree hiding the edge of a roof and [output] the edge of a roof without trees.

In this way, the adversarial neural network (GAN) can convert both roofs with and without trees into the same roofs without obstructions.

In the training process, the parameters are used to train the adversarial neural network (GAN) to extract the edge of the roof picture.

Referring to FIG. 1, the first generator unit 100 receives a Canny edge detected image and outputs by repeating encoding and decoding, and the output is inputted to the first discriminator unit 150.

The first discriminator unit 150 receives the Canny image (data B) and the output from the first generation unit 100 as a pair of inputs, and generates a target output T.

On the other hand, the second discriminator unit 250 receives the output (O) in which the original image (data A) passes the second generator unit 200 and the target output (T) output from the first discriminator unit as a pair of inputs, the second discriminator unit 250 predicts a corrected output image from each pair of inputs.

As a result of the prediction, the weights of the parameters assigned to the second generator unit 200 and the second discriminator unit 250 are optimized according to the prediction accuracy of the second discriminator unit 250, and the second generator unit 200 and the second discriminator unit 250 experience training processes again.

Figure 2:
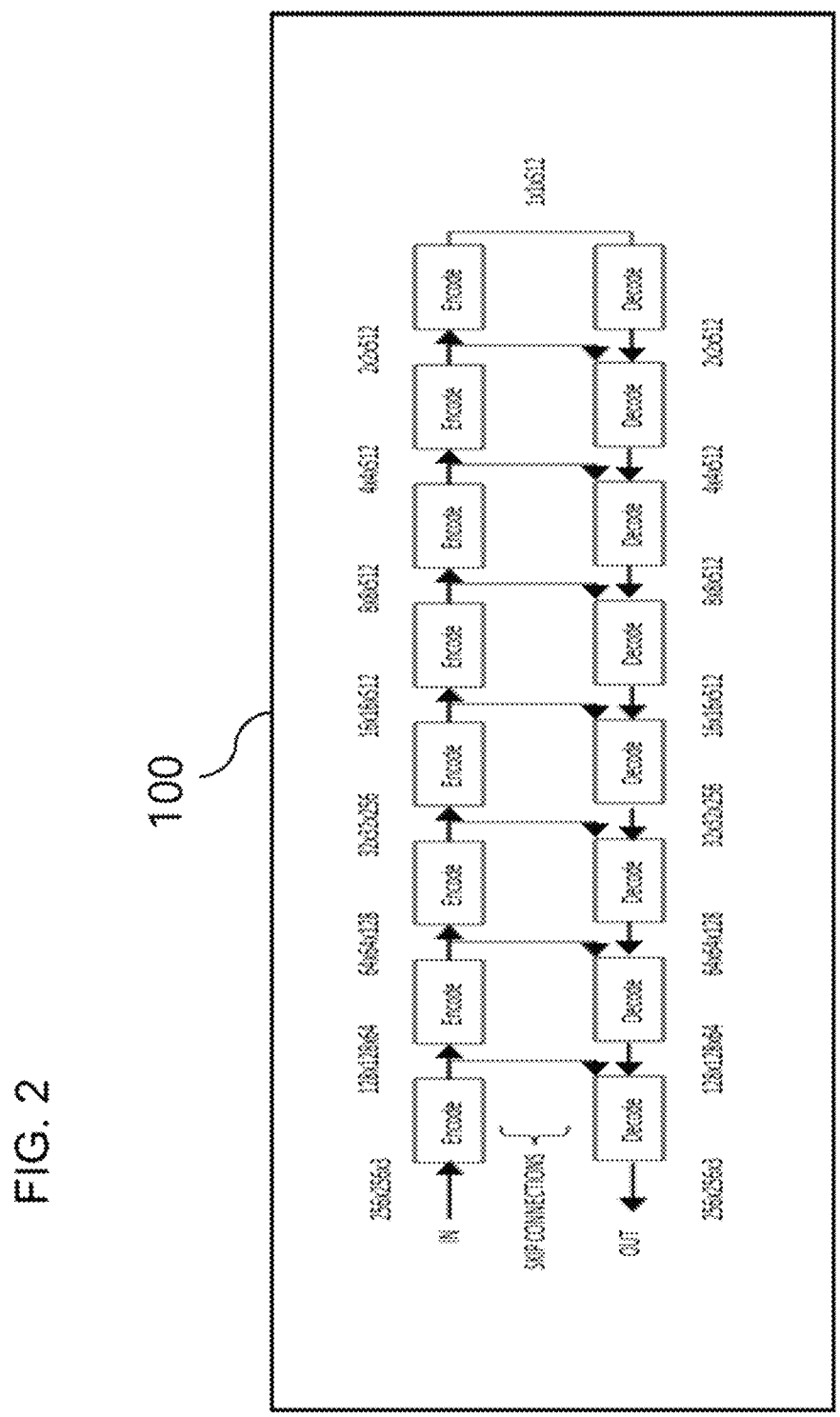
FIG. 2 is a detailed configuration block diagram of the first generator unit shown in FIG. 1.

FIG. 2 is a detailed configuration block diagram of the first generator unit shown in FIG. 1.

Referring to FIG. 2, the first generator unit 100 shown in FIG. 1 receives a Canny edge detected image including a configuration in which an encoder and a decoder network are connected (intermediate connection configuration is omitted), and outputs by repeating encoding and decoding, and the output is inputted to the first discriminator unit 150.

Figure 3:
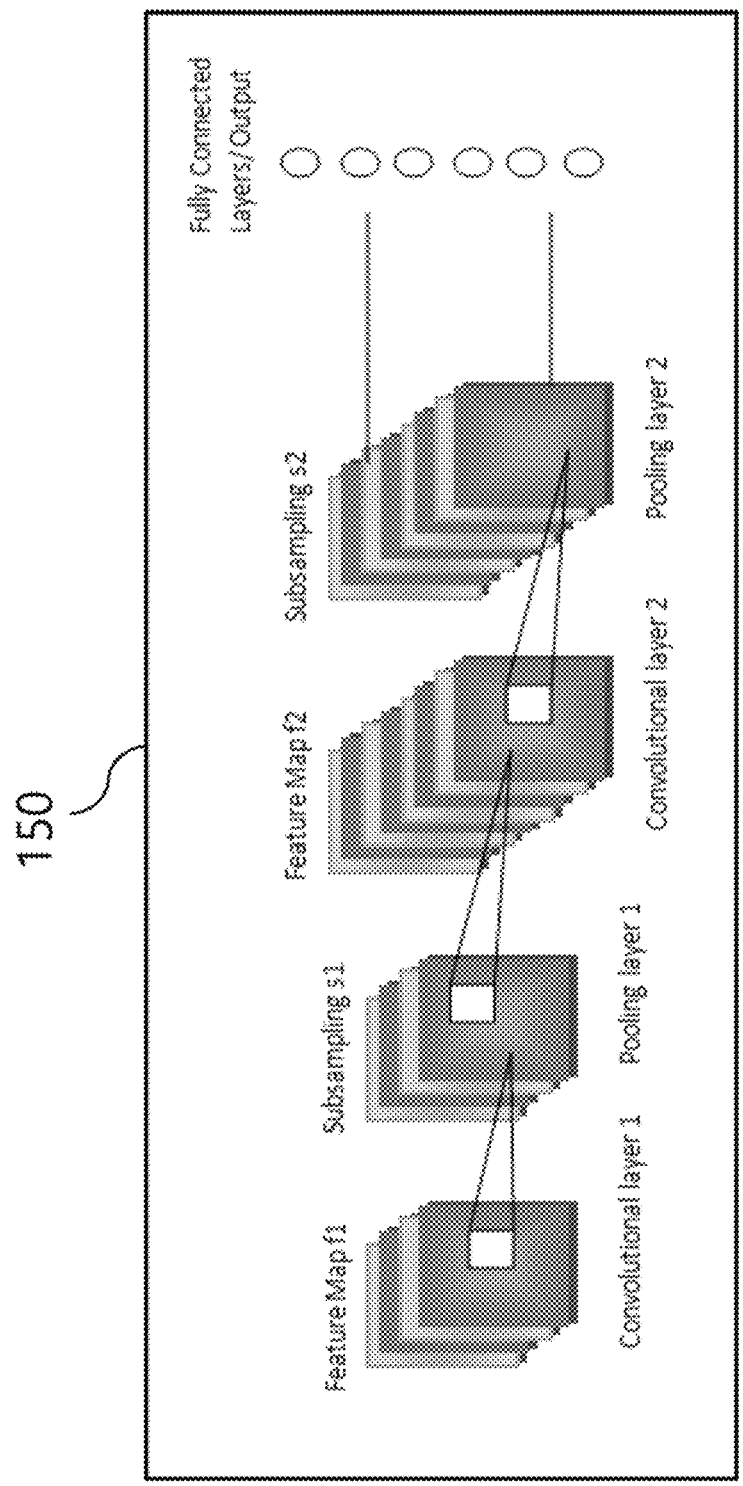
FIG. 3 is a detailed configuration block diagram of the first discriminator unit shown in FIG. 1.

FIG. 3 is a detailed configuration block diagram of the first discriminator unit shown in FIG. 1.

Referring to FIG. 3, the first discriminator unit 150 is a Deep Convolutional Neural Network, and includes first and second convolutional layers for feature maps and first and second pooling layers for subsamplings, and outputs fully connected layers.

Figure 4:
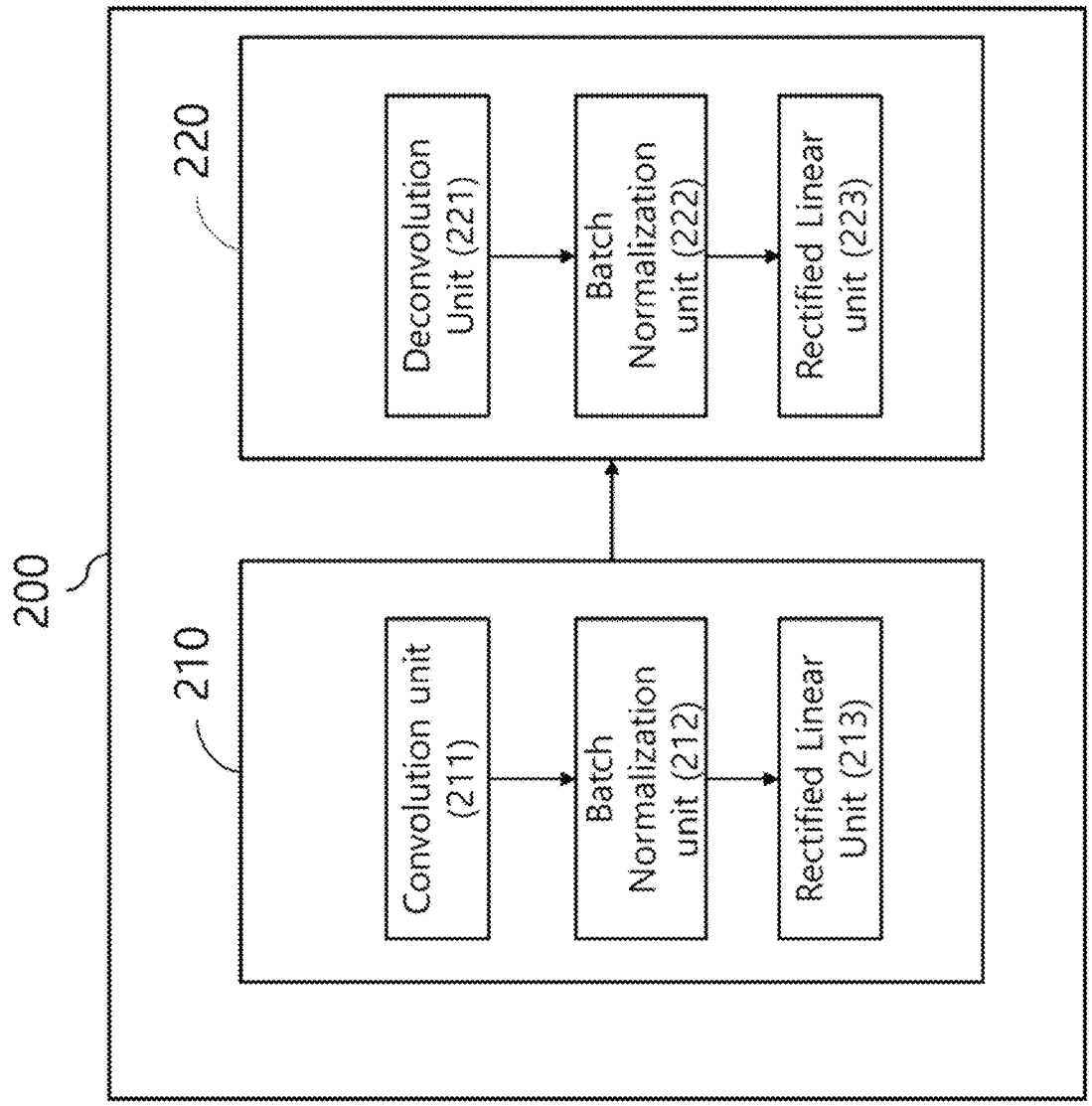
FIG. 4 is a detailed configuration block diagram of the second generator unit shown in FIG. 1.

FIG. 4 is a detailed configuration block diagram of the second generator unit shown in FIG. 1.

Referring to FIG. 4, the second generator unit includes an encoder unit 210 and a decoder unit 220 and processes decoding after encoding process.

A convolution unit 211, a batch normalization unit 212, and a rectified linear unit 213 are connected in the encoder unit 210.

Figure 5:
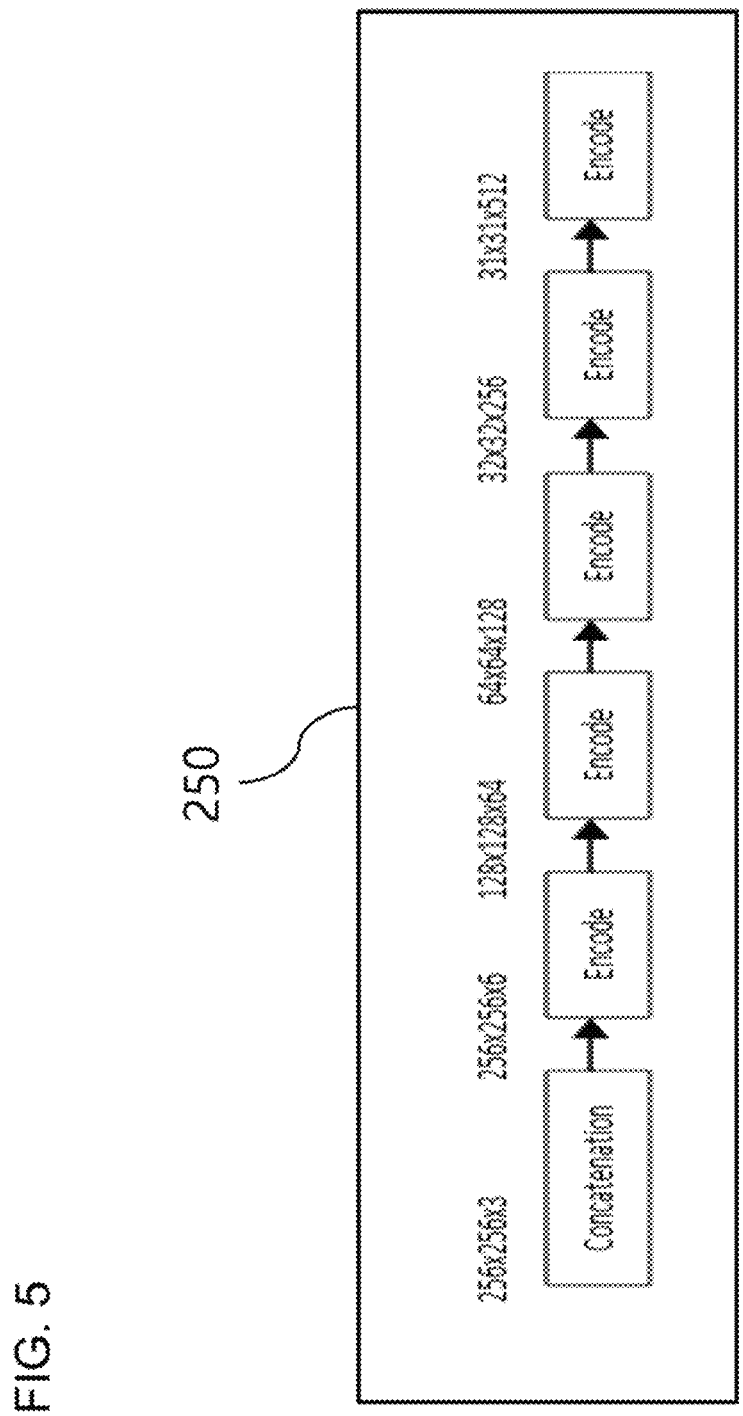
FIG. 5 is a detailed configuration block diagram of the second discriminator unit shown in FIG. 1.

FIG. 5 is a detailed configuration block diagram of the second discriminator unit shown in FIG. 1.

Referring to FIG. 5, the second discriminator unit 250 is configured to output through a plurality of decoders after concatenation process.

Figure 6:
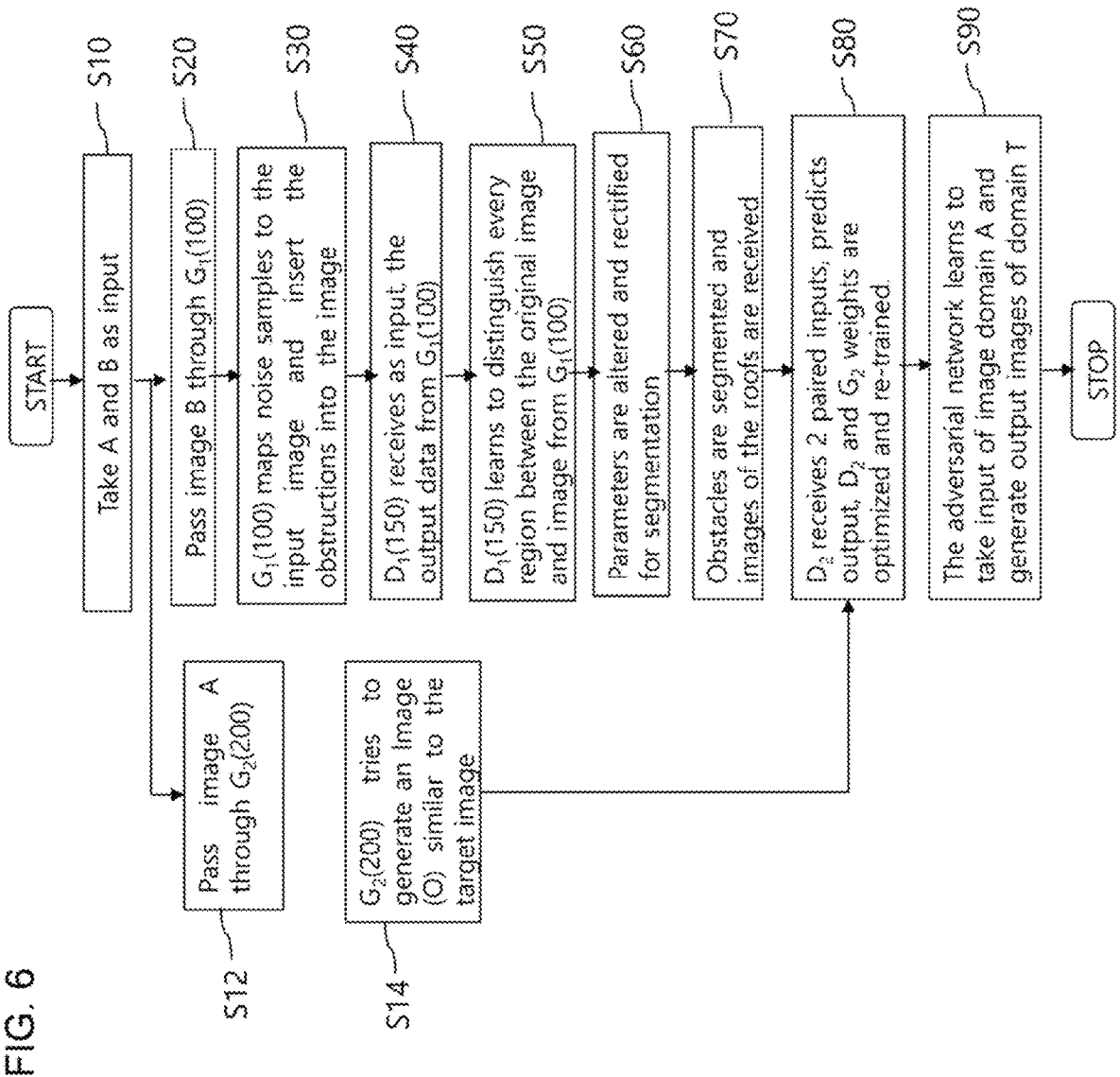
FIG. 6 shows a flow chart of the roof edge image extraction system for solar panel installation using machine learning according to the present invention.

FIG. 6 shows a flow chart of the roof edge image extraction system for solar panel installation using machine learning according to the present invention.

Referring to FIG. 6, the process of extracting the roof edge image for solar panel installation using machine learning in the generative adversarial neural network (GNA) is as follows.

First, the original rooftop photo collection is taken as the data set A, and the image collection with the identified roof edge is taken as the data set B, the data set A and B are inputted to the roof edge image extraction system for solar panel installation using machine learning (S10).

The data set A is inputted to the second generator unit 200 and passes through the second generation unit 200, and the second generator unit 200 generates an image similar to the target image (S12, S14).

Here, referring to FIG. 4, the second generator unit 200 goes through an encoding step and a decoding step.

The encoding process of the second generator unit 200 includes a convolution process, a batch normalization process, and a rectification linear process, and the decoding process of the second generator unit 200 includes a deconvolution process, a batch normalization process, and a rectification linear process.

On the other hand, the data set B is inputted to the first generator unit 100 as an image collection identified by Canny edge detection and passes through the first generator unit 100 (S20).

The first generator 100 maps noise samples to the input image and inserts the obstructions (S30).

The obstructions are such as trees, chimneys, and discs that hide the edges of the building around the roof of the building, and it is impossible to accurately distinguish the edges of the roof of the building.

Next, the first discriminator unit 150 has access to the original input image data set, receives the output from the first generator unit 100 as an input, and learns to distinguish every region between the original image and the image output from the first generator unit 100 (S40, S50).

Based on the results of the adversarial training between the first generator unit 100 and the first discriminator unit 150, parameters are altered and rectified for segmentation (S60).

The generator unit, which is an artificial intelligence that creates an image by itself, and the discriminator unit, which is an artificial intelligence that distinguishes the original image, uses various parameters to extract the roof edge and the parameters are optimized as the training is repeated to extract the roof edge.

Subsequently, the obstructions hiding the edge of the roof are segmented, and the desired edge detected images T of roof are received by the second discriminator unit 250 (S70).

The second discriminator unit 250 receives the first pair (A, T) of the original image data and the output image outputted from the first discriminator unit 250 and the second pair (A, O) of the original image data and the image outputted from the second generator unit 200 and the second discriminator unit 250 predicts the correct output image from each pair. According to accuracy of the prediction, the weights of parameters assigned to the second discriminator and the second generator are optimized and the second discriminator unit 250 and the second discriminator unit 250 are re-trained (S80).

Subsequently, the adversarial neural network comprises two generators and two discriminators, receives the image A region as input and is trained to generate an output image of the target image T region, so that the GAN can extract all the edges of the roof hidden behind the obstructions. After repeating the training, the GAN can remove obstructions hiding the edges of the roof image, automatically connect the edges of the roof, and generate complete edge image of the roof image (S90).

Figure 8:
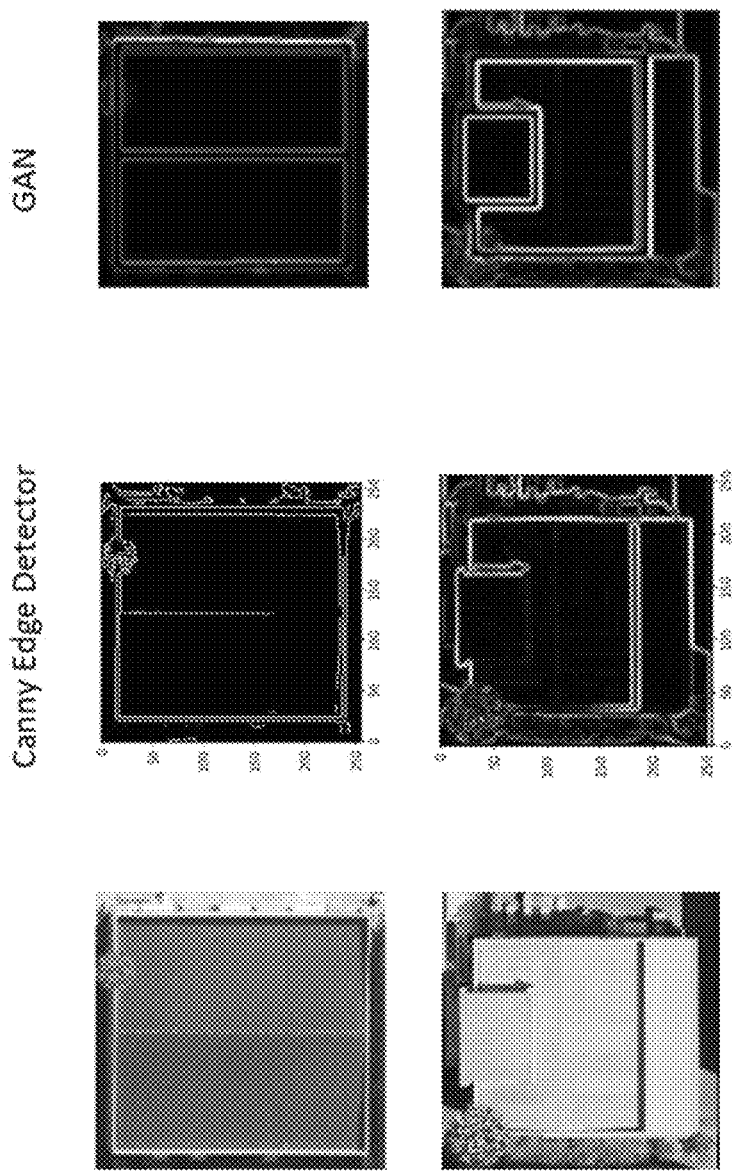
FIG. 8 is comparison result photographs of the roof edge image extraction system for solar panel installation using machine learning according to the present invention.

FIG. 8 is comparison result photographs of the roof edge image extraction system for solar panel installation using machine learning according to the present invention.

As shown in FIG. 8, the roof edge image extraction system according to the present invention is different from the conventional generative adversarial neural network. Though edge extraction and target detection and background recovery as well can be performed in the present invention, they cannot be performed in images conversion GAN such as cycle GAN or other GANs.

Although the present invention has been described in detail with reference to concrete embodiments disclosed herein, it is apparent to those skilled in the art that various modifications and alterations are possible within the scope of the technical idea of the present invention, and it is obvious that such modifications and alterations belong to the appended claims.

INDUSTRIAL APPLICABILITY

The present invention automatically produces the edges of the roof image from image data through machine learning of a generative adversarial neural network, and automatically connects the edges of the roof to generate and extract the image of the edge of the roof even if the edges of the roof are hidden by obstructions.

The invention claimed is:

1. A method of extracting a roof edge image for solar panel installation by using machine learning for a generative adversarial neural network (GAN) based image conversion model, the method comprising:

inputting original rooftop image data (A) and an image data set (B) in which the rooftop edge is detected into the roof edge image extraction system;

the original rooftop image data (A) being inputted to a second generator unit of the system and passing through the second generator unit of the system and the second generator unit outputting an image (O) similar to a target image (T);

image data (B) in which the rooftop edge is detected being inputted to a first generator unit of the system and passing the first generator unit of the system;

the first generator unit mapping noise samples and inserting obstructions into the input image data (B);

a first discriminator unit of the system having access to the original input image data set and receiving the output from the first generator unit as an input, training to discriminate each region between the original image and the received input;

parameters for segmentation being altered and rectified according to the adversarial training result between the first generator unit and the first discriminator unit, obstruction hiding the edge of the roof being segmented, and a second discriminator unit receiving the image in which desirable roof edges are detected;

the second discriminator unit receiving a first pair (A, T) of the original image data and the output image output from the first discriminator unit and a second pair (A, O) of the original image data and the image output from the second generator unit, respectively, predicting the correct output image from each pair, and weights of the parameters assigned to the second generator and the second discriminator being optimized according to the prediction accuracy, the second generator unit and the second discriminator unit being trained again; and the roof edge image extraction system removing the obstructions hiding the edge portion of the roof image, extracting the edge of roof image, connecting the edge parts automatically and generating the complete roof edge image.

2. The method of extracting a roof edge image for solar panel installation by using machine learning according to claim 1, wherein:

the generative adversarial neural network (GAN) includes two generator units and two discriminator units and receives the original image (A) region as input, trains to generate an output image of the target image (T) region, and the GAN repeats training so as to extract all the edges of the roof hidden behind obstructions.

3. The method of extracting a roof edge image for solar panel installation by using machine learning according to claim 1, wherein:

the generative adversarial neural network (GAN) based image conversion model is a pixel-to-pixel generative adversarial neural network (Pix2pix GAN).

4. The method of extracting a roof edge image for solar panel installation by using machine learning according to claim 1, wherein:

the first generator unit receives Canny edge detected images and outputs by repeating encoding and decoding.

5. The method of extracting a roof edge image for solar panel installation by using machine learning according to claim 1, wherein:

the second generator unit comprises encoding process, and the encoding process comprises a convolution process, a batch normalization process, and a rectification linear process.

6. The method of extracting a roof edge image for solar panel installation by using machine learning according to claim 1, wherein:

the second generator unit comprises decoding process, and the decoding process comprises a deconvolution process, a batch normalization process, and a rectification linear process.

* * * * *